United States Patent
van Os et al.

(10) Patent No.: US 8,973,119 B2
(45) Date of Patent: Mar. 3, 2015

(54) SECURE METHOD TO EXCHANGE DIGITAL CONTENT BETWEEN A SCANNING APPLIANCE AND SMS-ENABLED DEVICE

(71) Applicants: Ron van Os, Boulder, CO (US); Murray Dennis, Pleasanton, CA (US)

(72) Inventors: Ron van Os, Boulder, CO (US); Murray Dennis, Pleasanton, CA (US)

(73) Assignee: Scannx, Inc., Pleasanton, CA (US)

( * ) Notice: Subject to any disclaimer, the term of this patent is extended or adjusted under 35 U.S.C. 154(b) by 0 days.

(21) Appl. No.: 13/968,038

(22) Filed: Aug. 15, 2013

(65) Prior Publication Data

US 2014/0051418 A1  Feb. 20, 2014

Related U.S. Application Data

(60) Provisional application No. 61/742,731, filed on Aug. 17, 2012.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04W 4/00* | (2009.01) |
| *H04W 12/00* | (2009.01) |
| *H04W 12/06* | (2009.01) |
| *H04W 12/08* | (2009.01) |

(Continued)

(52) U.S. Cl.
CPC .............. *H04W 4/001* (2013.01); *H04W 4/003* (2013.01); *H04W 12/06* (2013.01); *H04W 12/00* (2013.01); *H04W 12/12* (2013.01); *H04W 12/08* (2013.01); *H04W 4/18* (2013.01)
USPC ............................................................ 726/7

(58) Field of Classification Search
CPC ..... H04W 4/001; H04W 12/12; H04W 12/08; H04W 12/06; H04W 12/00
USPC ............................................................ 726/7
See application file for complete search history.

(56) References Cited

U.S. PATENT DOCUMENTS 7,461,067 B2 * 12/2008 Dewing et al. ................. 1/1
7,869,067 B2 *  1/2011 Blair et al. ................ 358/1.15
8,120,460 B1 *  2/2012 Zhu .............................. 340/5.73

(Continued)

*Primary Examiner* — Dede Zecher
*Assistant Examiner* — Jason C Chiang
(74) *Attorney, Agent, or Firm* — Blakely, Sokoloff, Taylor & Zafman LLP (57) ABSTRACT

A method and apparatus for exchanging digital content between a scanning appliance and a mobile device are disclosed. In one embodiment, the method comprises: transferring digital content via a network to a remotely accessible data storage server, the digital content being generated from a document; receiving, in response to user input via a first graphical user interface, a phone number; sending a first text message to a first device after validating the phone number, the first text message including a code; receiving, in response to user input via a second graphical user interface, the code being input by a user; sending a second text message to the first device, the second text message including an address of the digital content in the network; monitoring whether the digital content has been accessed; receiving a request for the digital content from the first device, the request including the address retrieved from the second text message; and sending, in response to the request, the digital content and an indication of a type of the digital content to the first device, the type information for use by a browser in determining software on the first device capable of rendering the digital content on a display of the first device.

16 Claims, 8 Drawing Sheets

(51) Int. Cl.
*H04W 12/12* (2009.01)
*H04W 4/18* (2009.01)

(56) References Cited

U.S. PATENT DOCUMENTS

| | | | |
|---|---|---|---|
| 8,151,344 B1* | 4/2012 | Channakeshava | 726/19 |
| 8,165,609 B2* | 4/2012 | Fang | 455/466 |
| 8,578,160 B2* | 11/2013 | Applin et al. | 713/168 |
| 8,620,815 B1* | 12/2013 | Wagner-Krankel et al. | 705/50 |
| 8,621,214 B2* | 12/2013 | Johnson et al. | 713/168 |
| 8,629,911 B2* | 1/2014 | Chang et al. | 348/211.6 |
| 8,655,315 B2* | 2/2014 | Huang et al. | 455/411 |
| 8,705,447 B2* | 4/2014 | Choi | 370/328 |
| 2003/0163429 A1* | 8/2003 | Humbeutel et al. | 705/51 |
| 2006/0083187 A1* | 4/2006 | Dekel | 370/310 |
| 2007/0203850 A1* | 8/2007 | Singh et al. | 705/67 |
| 2007/0250767 A1* | 10/2007 | Wisniewski | 715/513 |
| 2008/0076459 A1* | 3/2008 | Shaju | 455/466 |
| 2008/0209034 A1* | 8/2008 | Shin et al. | 709/224 |
| 2009/0106138 A1* | 4/2009 | Smith et al. | 705/35 |
| 2009/0108057 A1* | 4/2009 | Mu et al. | 235/375 |
| 2010/0293189 A1* | 11/2010 | Hammad | 707/769 |
| 2010/0327054 A1* | 12/2010 | Hammad | 235/375 |
| 2011/0055336 A1* | 3/2011 | Park et al. | 709/206 |
| 2011/0184866 A1* | 7/2011 | Shakkarwar | 705/44 |
| 2011/0190009 A1* | 8/2011 | Gerber et al. | 455/456.3 |
| 2012/0010992 A1* | 1/2012 | Gillin | 705/14.49 |
| 2012/0278616 A1* | 11/2012 | Stevens | 713/165 |
| 2013/0138956 A1* | 5/2013 | Swist | 713/168 |
| 2013/0173754 A1* | 7/2013 | van Os et al. | 709/219 |
| 2013/0191466 A1* | 7/2013 | Perlow et al. | 709/206 |
| 2013/0305328 A1* | 11/2013 | Leung | 726/6 |
| 2014/0040045 A1* | 2/2014 | Webb et al. | 705/14.67 |

* cited by examiner

SECURE METHOD TO EXCHANGE DIGITAL CONTENT BETWEEN A SCANNING APPLIANCE AND SMS-ENABLED DEVICE

PRIORITY

The present patent application claims priority to and incorporates by reference the corresponding provisional patent application Ser. No. 61/742,731, titled, "Secure method to exchange digital content between a scanning appliance and SMS enabled smart device, like a smart phone or tablet," filed on Aug. 17, 2012.

FIELD OF INVENTION

Embodiments of the present invention relate to the field of document capture and retrieval; more particularly, embodiments of the present invention relate to secure exchange of digital content that has been captured between two devices without requiring a direct network connection.

BACKGROUND OF THE INVENTION

Document capture and retrieval are commonly used to create digital content that may be stored and subsequently accessed by users. The digital content can originate from a camera or document scanning station or document scanner attached to a computer, which convert documents and/or images to digital content. Once the content has been created, it may be transferred and stored in memory.

Many current state of the art document capture and retrieval systems require an end user to enroll or subscribe to a web-based service by use of some sort of credentials. These credentials are typically a username and password. To store or upload digital content, the end user needs to login to the service and transfer the content to the service. Thereafter, in order to retrieve or otherwise access the content, the end user needs to repeat the login process. Software in these systems or other devices allows the end user to login and access the digital content.

SUMMARY OF THE INVENTION

A method and apparatus for exchanging digital content between a scanning appliance and a mobile device are disclosed. In one embodiment, the method comprises: transferring digital content via a network to a remotely accessible data storage server, the digital content being generated from a document; receiving, in response to user input via a first graphical user interface, a phone number; sending a first text message to a first device after validating the phone number, the first text message including a code; receiving, in response to user input via a second graphical user interface, the code being input by a user; sending a second text message to the first device, the second text message including an address of the digital content in the network; monitoring whether the digital content has been accessed; receiving a request for the digital content from the first device, the request including the address retrieved from the second text message; and sending, in response to the request, the digital content and an indication of a type of the digital content to the first device, the type information for use by a browser in determining software on the first device capable of rendering the digital content on a display of the first device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for facilitating a secure transfer of information from a device (e.g., an acquisition device, such as a large size scanner, camera, etc.) to another device, such as, for example, a mobile smart device (e.g., an iPhone). In one embodiment this occurs without requiring knowledge of wireless connectivity opportunities like hotspots, nor with the exchange of user credentials or a physical connection between the devices. That is, embodiments of the present invention remove any requirement that involves supplying credentials, thereby greatly simplifying the process of digital content exchanges.

In addition, the techniques described herein provide inherent resiliency to ensure reliable data transfer (in those cases where the wireless connectivity is less reliable) by supporting time asynchronous transfers and providing persistent temporary storage of the data in transit.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Figure 1:
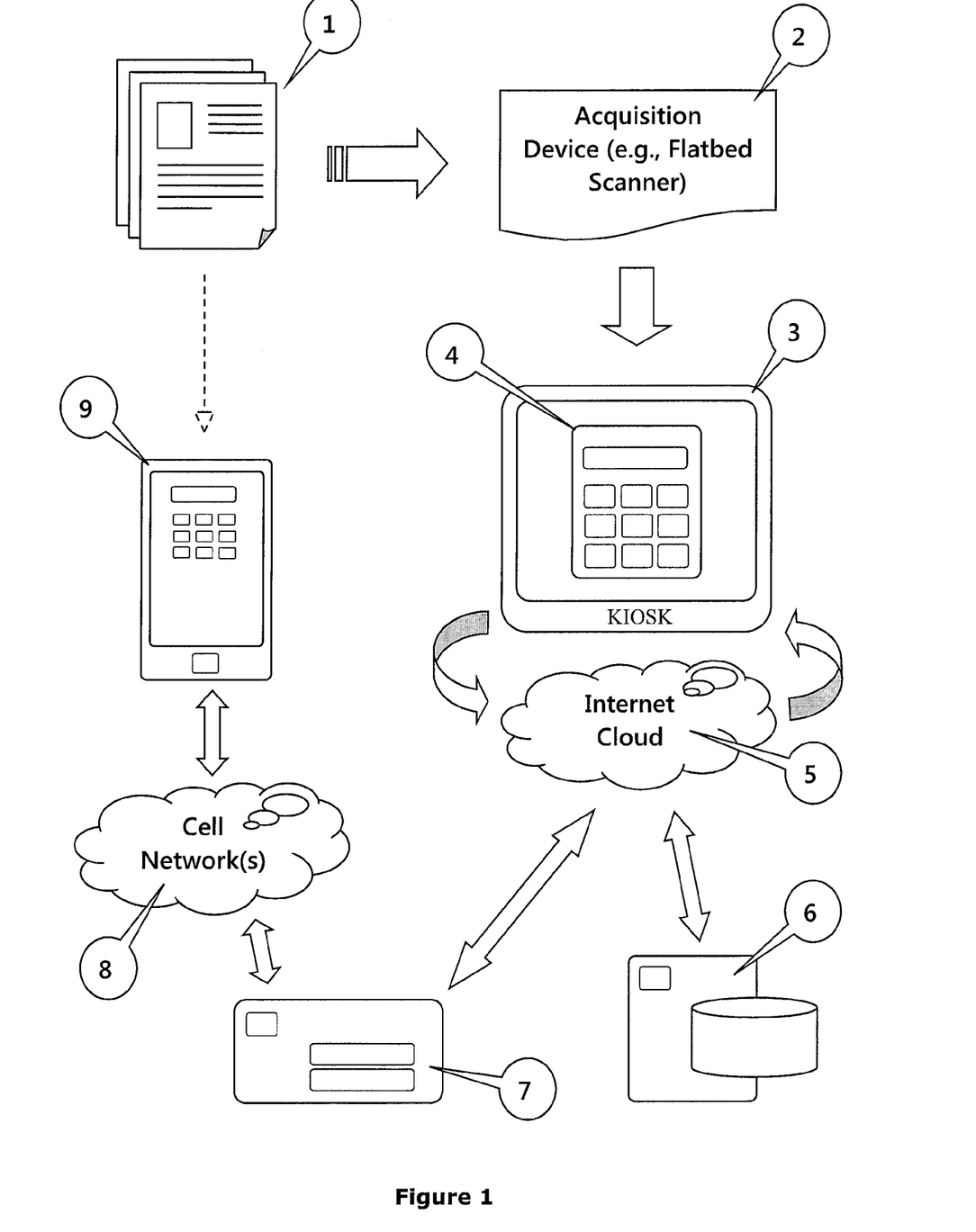
FIG. 1 is a data flow diagram illustrating paper documents being run through an acquisition device capable of converting the paper documents into digital content representing the same.

FIG. 1 is a data flow diagram illustrating the use of an acquisition device to convert documents (e.g., paper documents) into digital content representing the same. Subsequently, the digital content is transferred to a data storage device via the internet, and made accessible to a second device, via the universal resource locator (URL) address of the digital content received through a text message (e.g., SMS) exchange. In one embodiment, the acquisition device is part of a computer system and/or kiosk.

Referring to FIG. 1, original material 1 (e.g., paper documents, magazine articles, book pages) are run through an acquisition device 2 (e.g., a flatbed scanner) capable of converting the paper documents into digital content representing the same. The digital content is transferred to a computing device 3 (e.g., a kiosk, a desktop computer system, a fully embedded computer system, etc.) from acquisition device 2 and stored on its local storage media (e.g., a hard drive, a solid storage drive, etc.). Once the entire digital content has been received, computing device 3 transfers the digital content through a network 5 (e.g., the internet, wide area network (WAN), local area network (LAN), etc.) to a remotely accessible data storage server 6.

During or after completion of the transfer of the digital content to data storage server 6, the display device attached to or part of computing system 3 renders a user interface 4, prompting the user to enter the phone number of the device to receive the digital content.

In one embodiment, once the phone number has been entered, the computing system 3, through network 5, accesses a gateway 7 equipped with a modem (e.g., GSM or CDMA modem) to generate a text message that includes a randomly generated 6 character code and to send the message to the phone number previously entered by the user, through the cellular or other telephone network 8. Note that in alternative embodiments, the code may be of different lengths and need not be randomly generated and/or is generated in another fashion. Device 9 receives the text message and the user can continue to complete a phone number verification process, such as the one outlined in more detail below in the section entitled 'Phone number validation'. In one embodiment, device 9 comprises a mobile device (e.g., smart device/phone, mobile phone, tablet, etc.)

Note that in one embodiment, acquisition device 2 is attached to computing device 3. It is not implied that these are distinct and separate devices; they can be part of a single intelligent scanning device or multiple function peripheral (MFP) with a display device incorporated. Furthermore, in one embodiment, server 6 and gateway 7 of FIG. 1 are distinct single internet connected devices or a virtual device hosted inside an internet connected cloud computing environment.

While FIG. 1 depicts examples of discrete paper documents, embodiments of the present invention are not limited to these kinds of documents, and books magazines, newspapers and the like are all part of the definition of 'original material'.

Phone Number Validation

Figures 2A, 2B:
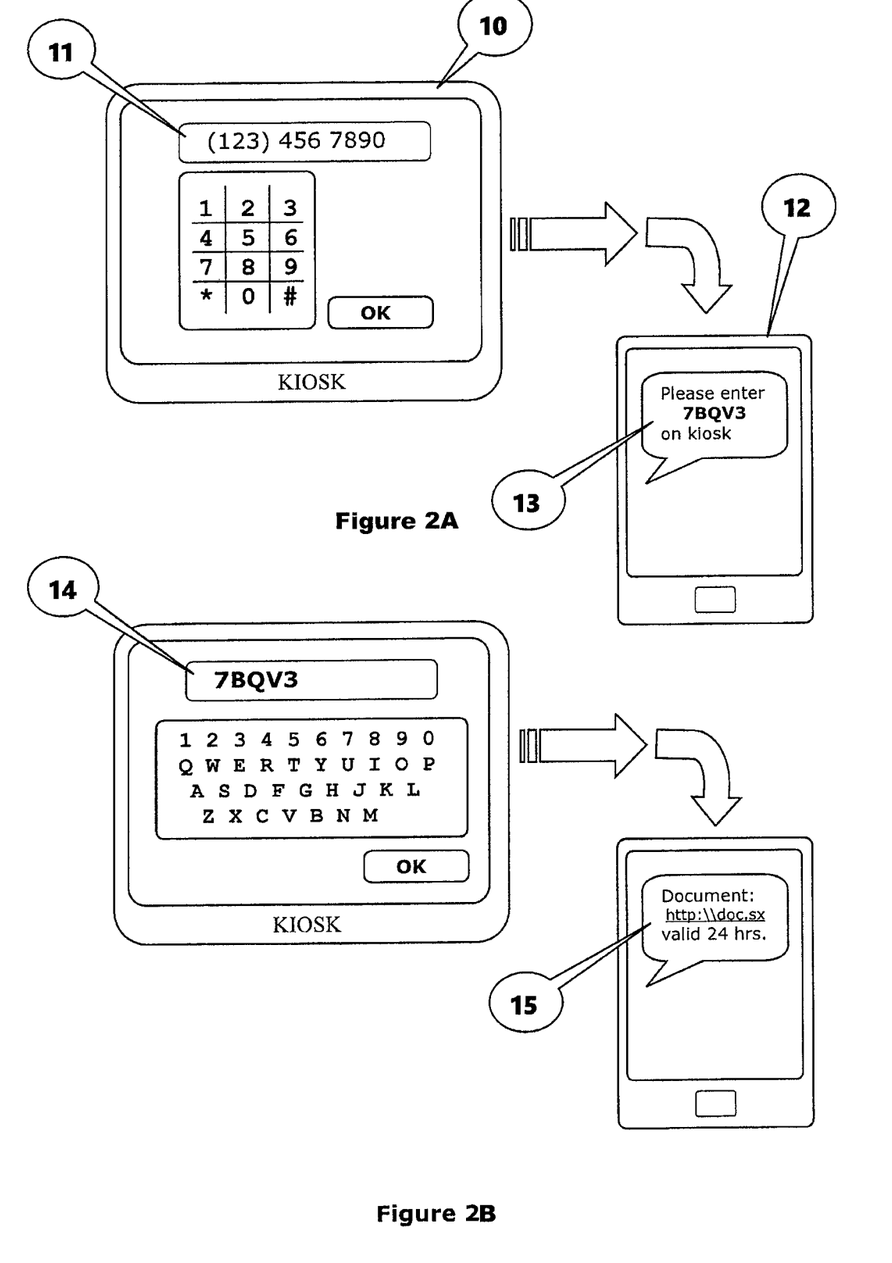
FIG. 2A illustrates one embodiment of a display device having a user interface for the entry of a phone number and a mobile device that displays a validation code.
FIG. 2B illustrates one embodiment of a display device for entry of a validation code and a mobile device displaying a text message with the URL.

FIG. 2A illustrates one embodiment of a display device attached to a computing system 10 having rendered a user interface 11 for the entry of a phone number. Once the user completes the entry of their phone number, either through the touchscreen attached to computing system 10, or an external keyboard (or keypad) attached to computing system 10, and select the 'OK' button, computing system 10 generates and internally stores a code. In one embodiment, the code is a randomly generated sequence of characters. Through gateway 7 of FIG. 1, computing system 10 creates a text message including the generated code and sends it to the provided phone number. Shortly thereafter, mobile device 12 receives text message 13 as shown in FIG. 2B.

In one embodiment, mobile device 12 comprises a smart device, such as, for example, an iPhone, iPad, windows Phone, and many Android Phones/Pads. Note that any mobile device capable of performing the functions described herein may be used.

Once the user has received the validation code on the mobile device 12, they enter the code in the user interface 14. User interface 14 may be displayed in the same display as user interface 11. In one embodiment, user interfaces 11 and 14 are both displayed on different portions of the same display or over the same portions of the display.

If the code validation entered matches the code previously stored, the computing system 10 generates a new text message 15, which includes a URL (Universal Resource Locator)

of the digital content representing the original material (e.g., original material 1 from FIG. 1) and sends the URL to the phone number previously entered as shown in FIG. 2B. Alternatively, memory location information other than a URL may be used.

Additionally, some cellular service providers have functionality, (e.g., computing resources) to determine if a text message was successfully sent (i.e., valid mobile phone number) and/or received. In such cases, computing device 10 provides feedback to the end user through the attached display device indicating the send/receive status and allows the re-entry of the phone number in case the text message could not be delivered.

Accessing the Digital Content

Once the user receives text message 15 on mobile device 12, they can select the URL, which in turn launches a browsing application on mobile device 12 to access the content pointed to which the URL points. The wireless connection is either made through a cellular data network or a direct wireless connection if a WiFi hotspot is in range, through the network 5 from FIG. 1, to data storage server 6 of FIG. 1.

In one embodiment, data storage server 6 of FIG. 1, through web server software running on it, returns a HTML content stream, including the MIME type of the content in the headers. Once the browsing application running on mobile device 12 retrieves the MIME type from the headers, it can launch another application or plugin capable of rendering the digital content as well as storing the content on mobile device 12.

Figure 3:
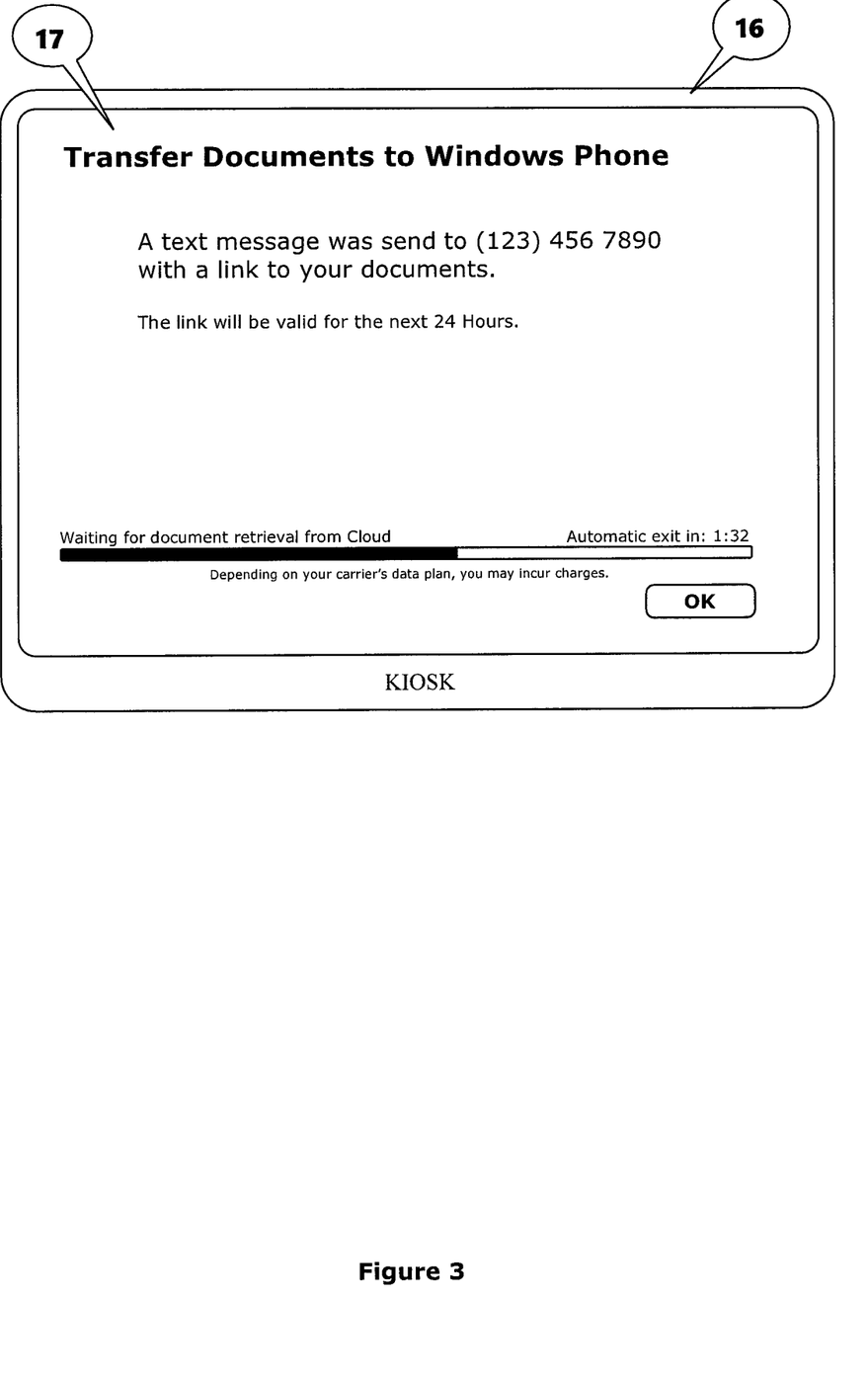
FIG. 3 shows an example of a user interface after successful completion of the phone number validation, where a system is waiting for the user to access digital content.

FIG. 3 shows an example of content 17 rendered on the display device attached to a computing device, such as, for example, computing device 16. While this screen is shown, software running on computing device 16 periodically checks with data storage server 6 of FIG. 1 to determine whether the content has been accessed. If it is determined that the content was accessed, the display device informs the users that the digital content was successfully transferred and completes the transaction.

In one embodiment, upon successful transfer, data storage server 6 of FIG. 1 deletes the digital content and redirects the URL used to access the content to a message (e.g., HTML content) informing the user that the content has been deleted. If the transfer was unsuccessful, data storage server 6 of FIG. 1 retains the digital content for a defined period (e.g., 24 hours; a predetermined number of days; a predetermined number of hours, etc.) before deleting the content.

Figure 4:
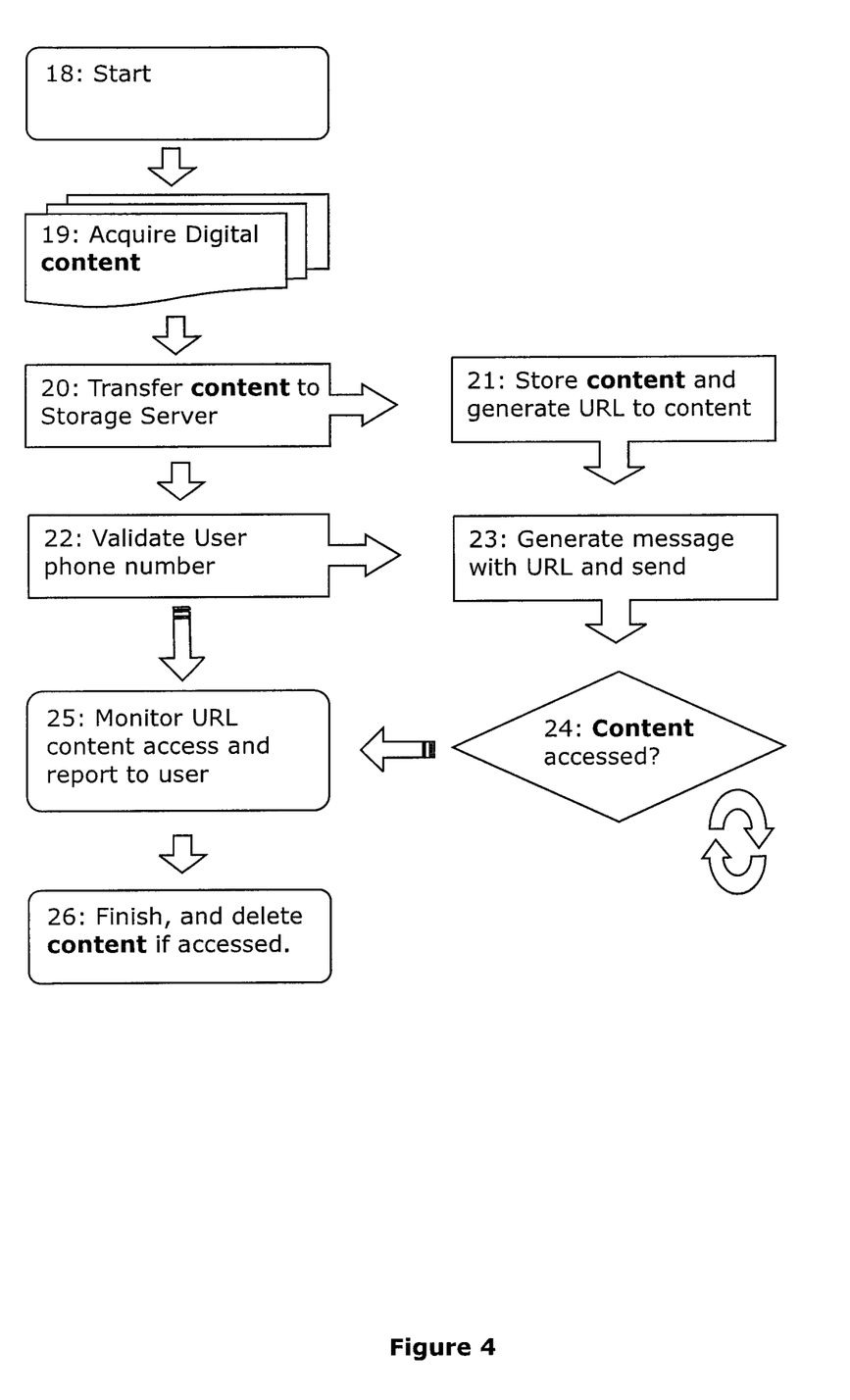
FIG. 4 illustrates an interaction between a computing device (e.g., a kiosk) and a data storage server.

FIG. 4 is a data flow diagram depicting a process performed by and the interaction between computing device 3 (e.g., a kiosk), a mobile device, and data storage server 6 of FIG. 1 in more detail. The operations are performed by processing logic that may comprise hardware (circuitry, dedicated logic, etc.), software (such as is run on a general purpose computer system or a dedicated machine), or a combination of both.

Referring to FIG. 4, the process starts once a user initiates the transfer software of their device (e.g., smart phone, PDA, etc.) by touching the appropriate button on the touchscreen on the computing device (e.g., kiosk) (or another button or input mechanism on the device) (processing block 18). Next, the desired original materials (e.g., magazine pages, book pages or other paper documents, etc) are converted into digital form to acquire digital content (processing block 19) and then the digital representation is transferred to a storage server (processing block 20).

Once the storage server has received the entire digital content, storage server returns URL of the content to the computing device (processing block 21) and continues to monitor whether or not the content was accessed (processing block 24). Meanwhile, the computing device validates the user phone number using a validation procedure, such as the one outlined in FIG. 2 (processing block 22). Upon completion, the computing device generates and sends a text message containing the URL to the digital content (processing block 23).

After sending the text message, the computing device periodically checks with the storage server to determine if the content was accessed (processing block 25). Once the user has accessed the content, the computing device completes the transaction and returns to its idle state ready for the next user (processing block 26).

It should be apparent from the descriptive above that the data transfer is inherently resilient. If the entire content was not transferred, the original data remains on the server and can be retrieved at a later time. This is an important feature when the wireless connectivity of a cellular or WiFi data network is unreliable. In addition, after retrieving the content URL, the user can choose not to download the entire content while at the computing device and wait until the user is near a more reliable network (e.g., a reliable WiFi network) to avoid data charges and overruns.

Thus, in one embodiment, the method performed by, or under control of, the computing system includes converting a paper document into digital content, transferring the digital content via a network to a remotely accessible data storage server, validating an end user's phone number and generating and sending, via text message, a URL to the digital content in the network, monitoring whether the digital content has been accessed, receiving a request for the digital content from a second device, the request including the address created from data resulting from decoding the code, sending an HTML content stream to the second device, including an indication of a type of the digital content, in response to the request, the type information for use by a browser in determining an application or plug-in capable of rending the digital content on a display of the second device, sending a message to the second device for displaying to a user an indication that the digital content was transferred, and deleting the digital content from the remotely accessible data storage server.

Similarly, the method performed by the mobile device comprises: receiving a first text message containing an access code used to validate the end user's phone number; receiving a second text message containing an address (e.g., URL) of digital content stored in a remotely accessible data storage server coupled to a network after being converted from a document (e.g., a paper document) and transferred to the remotely accessible data storage server; extracting the address of the digital content (e.g., URL) from the received second text message; sending a request for the digital content through the network using the extracted address; receiving the digital content (e.g., an HTML content stream) from a remotely accessible data storage server, including an indication of the a type of the digital content, in response to the request; retrieving the type from headers in the content (e.g., an HTML content stream); launching an application or plug-in capable of rendering the digital content; and rendering the digital content on a display of the second device. In one embodiment, the processor further includes monitoring whether the digital content has been accessed; determining the digital content was accessed; and receiving and displaying a message indicating the digital content was transferred and is to be subsequently deleted from the remotely accessible data storage server.

An Example of a Computer System

Figure 5:
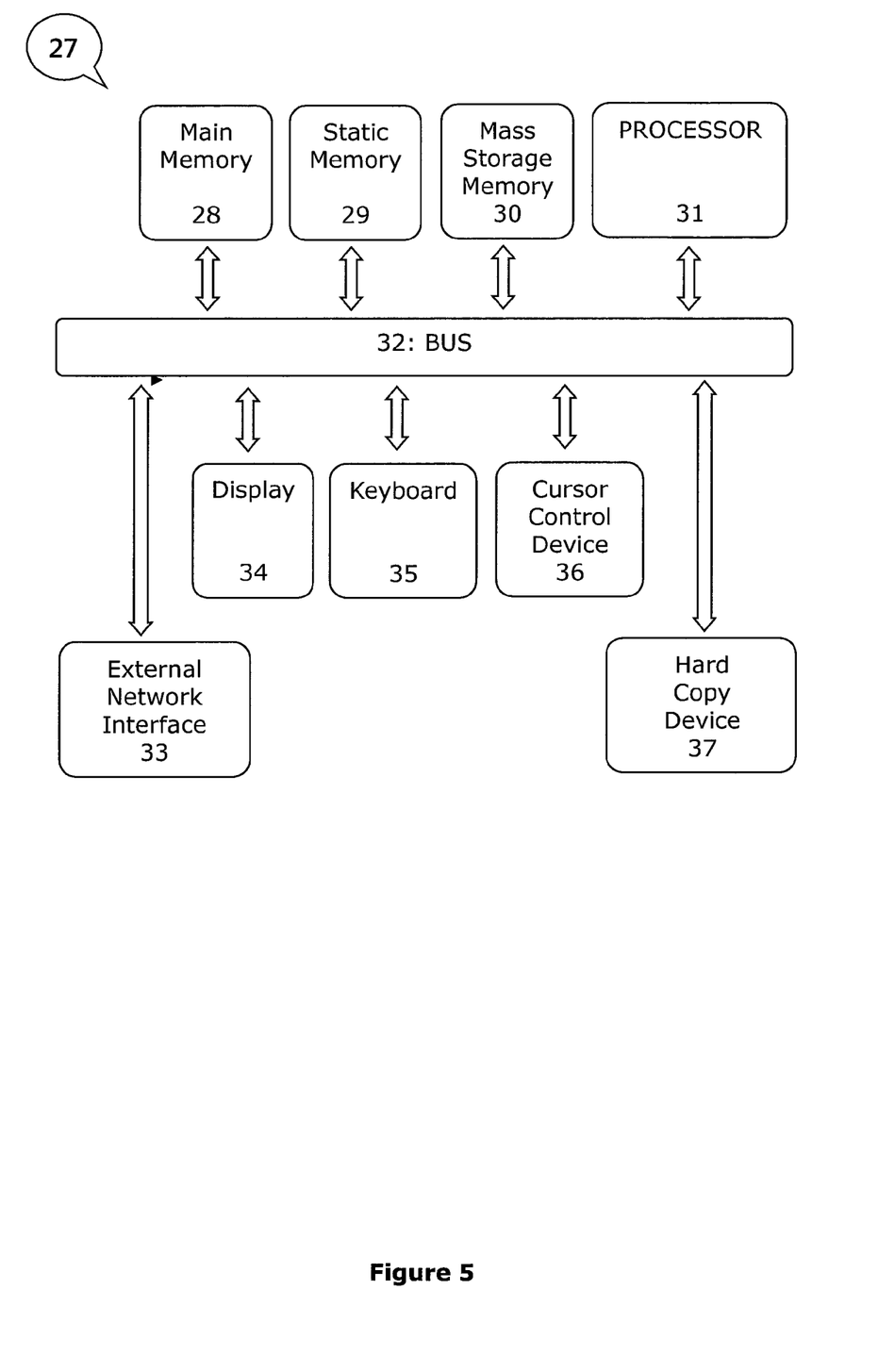
FIG. 5 is a block diagram of one embodiment of a computer system.

FIG. 5 is a block diagram of an exemplary computer system that may perform one or more of the operations described herein. Referring to FIG. 5, computer system 27 may comprise an exemplary client or server computer system. Computer system 27 comprises a communication mechanism or bus 32 for communicating information, and a processor 31 coupled with bus 32 for processing information. Processor 31 includes a microprocessor, but is not limited to a microprocessor, such as, for example, Pentium™, PowerPC™, Alpha™, etc.

System 27 further comprises a random access memory (RAM), or other dynamic storage device 28 (referred to as main memory) coupled to bus 32 for storing information and instructions to be executed by processor 31. Main memory 28 also may be used for storing temporary variables or other intermediate information during execution of instructions by processor 31.

Computer system 27 also comprises a read only memory (ROM) and/or other static storage device 29 coupled to bus 32 for storing static information and instructions for processor 31, and a data storage device 30, such as a magnetic disk or optical disk and its corresponding disk drive. Data storage device 30 is coupled to bus 32 for storing information and instructions.

Computer system 27 may further be coupled to a display device 34, such as a cathode ray tube (CRT) or liquid crystal display (LCD), coupled to bus 32 for displaying information to a computer user. An alphanumeric input device 35, including alphanumeric and other keys, may also be coupled to bus 32 for communicating information and command selections to processor 31. An additional user input device is cursor control 36, such as a mouse, trackball, trackpad, stylus, or cursor direction keys, coupled to bus 32 for communicating direction information and command selections to processor 31, and for controlling cursor movement on display 34.

Another device that may be coupled to bus 32 is hard copy device 37, which may be used for marking information on a medium such as paper, film, or similar types of media. Another device that may be coupled to bus 32 is a wired/wireless communication capability 33 to communication to a phone or handheld palm device.

Note that any or all of the components of system 27 and associated hardware may be used in the present invention. However, it can be appreciated that other configurations of the computer system may include some or all of the devices.

Figure 6:
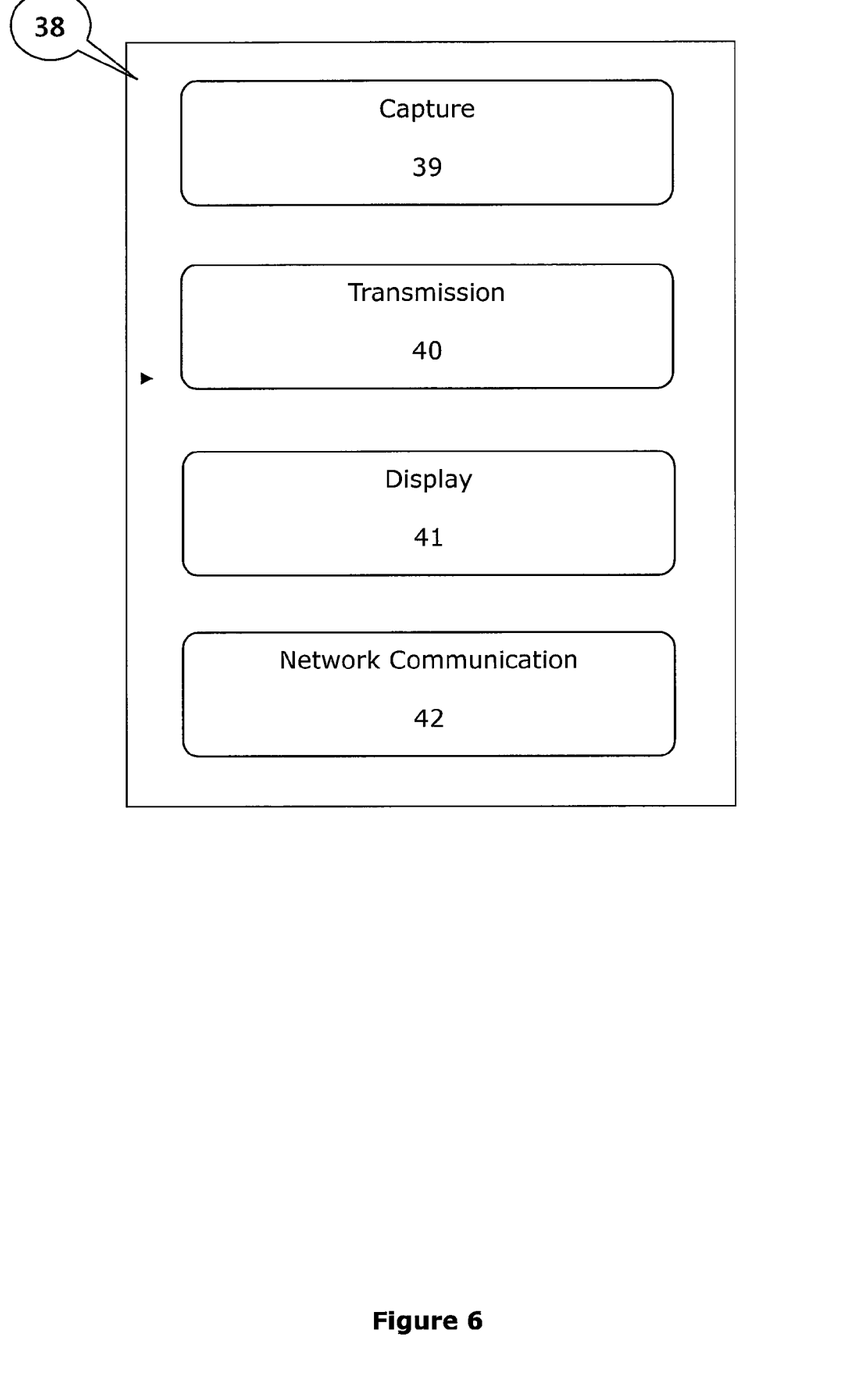
FIG. 6 illustrates a set of code (e.g., one or more programs) and data that is stored in memory of one embodiment of a computer system.

FIG. 6 illustrates a set of code (e.g., programs) and data that is stored in memory of one embodiment of a computing device, such as the computing device set forth in FIGS. 1 and 4. The computing device uses the code, in conjunction with a processor, to implement the necessary operations (e.g., logic operations) to implement the described herein.

Referring to FIG. 6, the memory 38 includes a capture module 39 which when executed by a processor is responsible for performing an image capture operation and creating digital content. The memory also stores a transmission module 40 which, when executed by a processor, is responsible for sending the digital content from the computing device. The memory also stores a display module 41 which, when executed by a processor, is responsible for displaying the code that the user can capture and decode to obtain their content from a data storage server, as well as display a message indicating the digital content has already been accessed. Memory 38 also stores a network communication module 42 used for performing network communication and communication with the other devices (e.g., servers, clients, etc.) to facilitate the transfer of the digital content and reception of the message indicating that the digital content is ready for access or has already been accessed.

An Example of a User Interface

Figure 7:
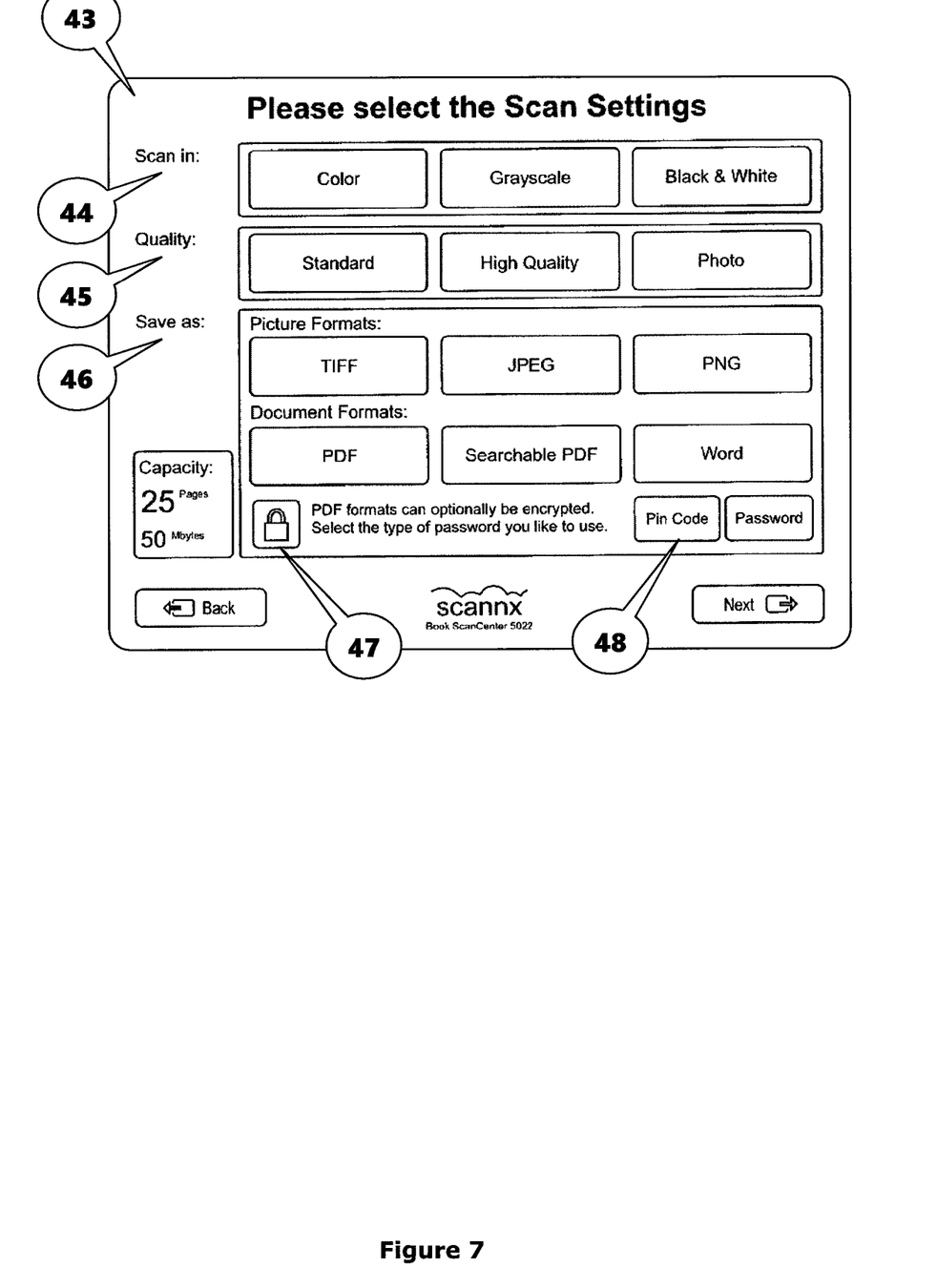
FIG. 7 is one embodiment of a user interface for selecting scan settings.

FIG. 7 is one embodiment of a user interface 43 for selecting scan settings. Referring to FIG. 7, the user interface allows a user to select scan-in options 44 (e.g., color, grayscale, black & white), quality options 45 (e.g., standard, high quality) and save options 46 (e.g., TIFF, JPEG, PNG), as well as document formats (e.g., PDF, searchable PDF, Word). In one embodiment, the user interface also allows a user to encrypt PDF formats 47, including selecting the PIN code 48 or password).

Figure 8:
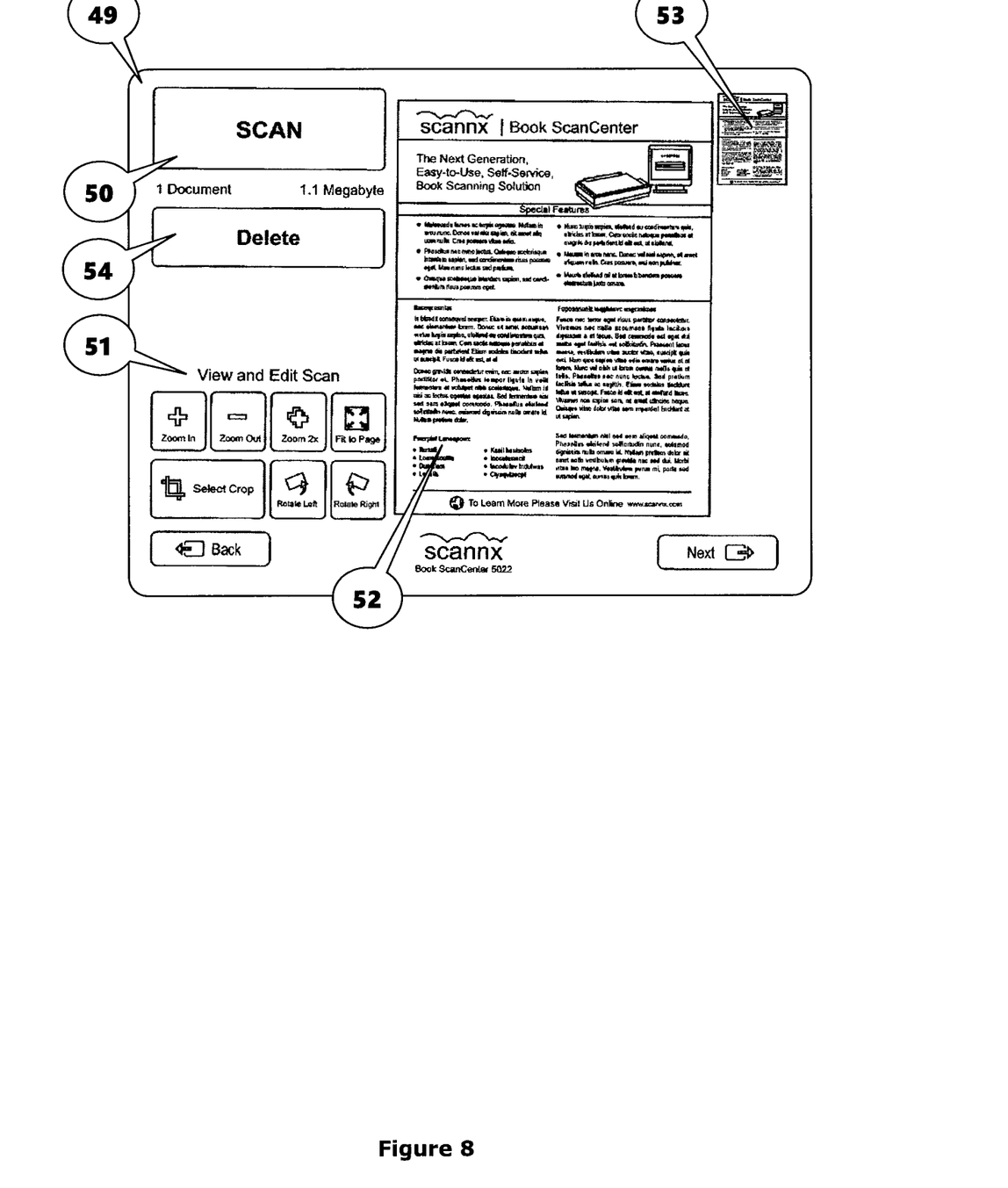
FIG. 8 is one embodiment of a user interface for starting a scan operation, including selecting one or more scan options.

FIG. 8 is one embodiment of a user interface 49 for starting a scan operation, including selecting one or more scan options. Referring to FIG. 8, the user interface allows a user to perform a scan by selecting a SCAN button 50 on the interface. In one embodiment, the user interface also allows the user to perform view and edit scan options 51 that include one or more of zoom in, zoom out, fit to page, select crop, rotate left, and rotate right. Additionally, the successfully scanned image is displayed 52, enabling the user to crop the image to their preference. When multiple images have been scanned, a thumbnail view 53 allows for quick access to that image. A delete button 54 is provided to remove an image from the document collection before transferring it to the mobile device (e.g., smart device).

In one embodiment, the scan operation is able to recognize that a document is not positioned correctly and automatically corrects the position of the scanned version of the document so that the user receives the content correctly positioned. For example, if the document is scanned up-side-down, the scan operation determines that the document is up-side-down and after scanning in the document, causes the document to be rotated and appear right-side-up.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

transferring digital content via a network to a remotely accessible data storage server, the digital content being generated from a document captured at a document scanning device;

receiving, in response to user input at a first graphical user interface of the document scanning device, a phone number;

sending a first text message to a mobile device after validating the phone number, the first text message including a code;

receiving, in response to user input at a second graphical user interface of the document scanning device, the code being input by a user;

in response to receipt of the code, sending a second text message to the mobile device, the second text message including an address of the digital content in the network;

monitoring whether the digital content has been accessed;

receiving a request for the digital content from the mobile device, the request including the address retrieved from the second text message;

sending, in response to the request, the digital content and an indication of a type of the digital content to the mobile device, the indication of the type of the digital content for use by a browser in determining software on the mobile device capable of rendering the digital content on a display of the mobile device; and deleting the digital content from the remotely accessible data storage server after the digital content has been sent to the mobile device.

2. The method defined in claim 1 further comprising converting the document into the digital content.

3. The method defined in claim 1 wherein the digital content comprises an HTML content stream.

4. The method defined in claim 1 wherein the software comprises an application or a plug-in.

5. The method defined in claim 1 wherein the address comprises a URL.

6. An article of manufacture having one or more non-transitory computer readable storage media storing instructions thereon which, when executed by a system, cause the system to perform a method comprising:

transferring digital content via a network to a remotely accessible data storage server, the digital content being generated from a document captured at a digital scanning device;

receiving, in response to user input at a graphical user interface of the digital scanning device, a phone number;

sending a first text message to a mobile device after validating the phone number, the first text message including a code;

receiving, in response to user input at a second graphical user interface of the digital scanning device, the code being input by a user;

sending a second text message to the mobile device, the second text message including an address of the digital content in the network;

monitoring whether the digital content has been accessed;

receiving a request for the digital content from the mobile device, the request including the address retrieved from the second text message; and sending, in response to the request, the digital content and an indication of a type of the digital content to the mobile device, the indication of the type of the digital content for use by a browser in determining software on the mobile device capable of rendering the digital content on a display of the mobile device; and deleting the digital content from the remotely accessible data storage server after the digital content has been sent to the mobile device.

7. The article of manufacture defined in claim 6 wherein the method further comprises converting the document into the digital content.

8. The article of manufacture defined in claim 6 wherein the digital content comprises an HTML content stream.

9. The article of manufacture defined in claim 6 wherein the software comprises an application or a plug-in.

10. The article of manufacture defined in claim 6 wherein the address comprises a URL.

11. The method define in claim 1, further comprising:

determining that a complete transfer of the digital content to the mobile device has occurred; and deleting the digital content from the remotely accessible data storage server in response to the determination of the complete transfer.

12. The method defined in claim 1, further comprising:

determining that an incomplete transfer or no transfer of the digital content to the mobile device has occurred; and deleting the digital content from the remotely accessible data storage server after a predetermined amount of time has elapsed.

13. The article of manufacture defined in claim 6, further comprising:

determining that a complete transfer of the digital content to the mobile device has occurred; and deleting the digital content from the remotely accessible data storage server in response to the determination of the complete transfer.

14. The article of manufacture defined in claim 6, further comprising:

determining that an incomplete transfer or no transfer of the digital content to the mobile device has occurred; and deleting the digital content from the remotely accessible data storage server after a predetermined amount of time has elapsed.

15. The method defined in claim 1, wherein the digital scanning device comprises an acquisition device to capture the document and generate the digital content, and a computing device coupled with the acquisition device to display the graphical user interface and the second graphical user interface on a display of the computing device.

16. The article of manufacture defined in claim 6, wherein the digital scanning device comprises an acquisition device to capture the document and generate the digital content, and a computing device coupled with the acquisition device to display the graphical user interface and the second graphical user interface on a display of the computing device.

\* \* \* \* \*